Oct. 9, 1928.                                              1,686,770
F. A. SCHMITZ
WEIGHING SCALE
Filed June 23, 1927          3 Sheets-Sheet 1
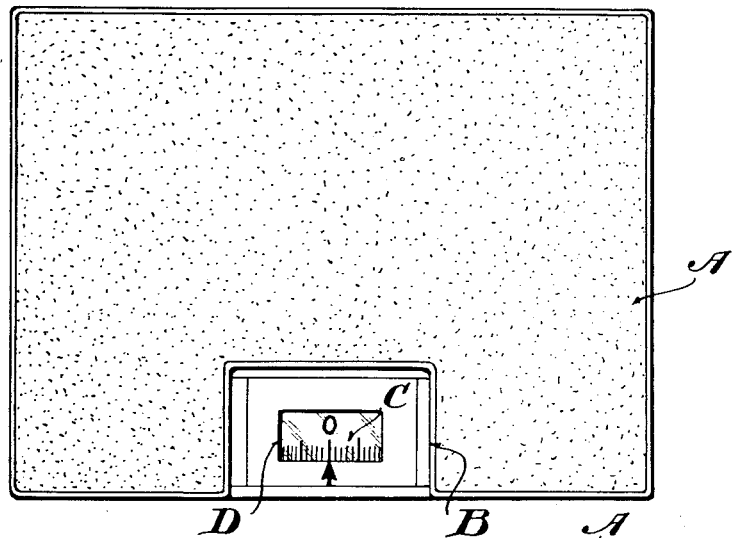
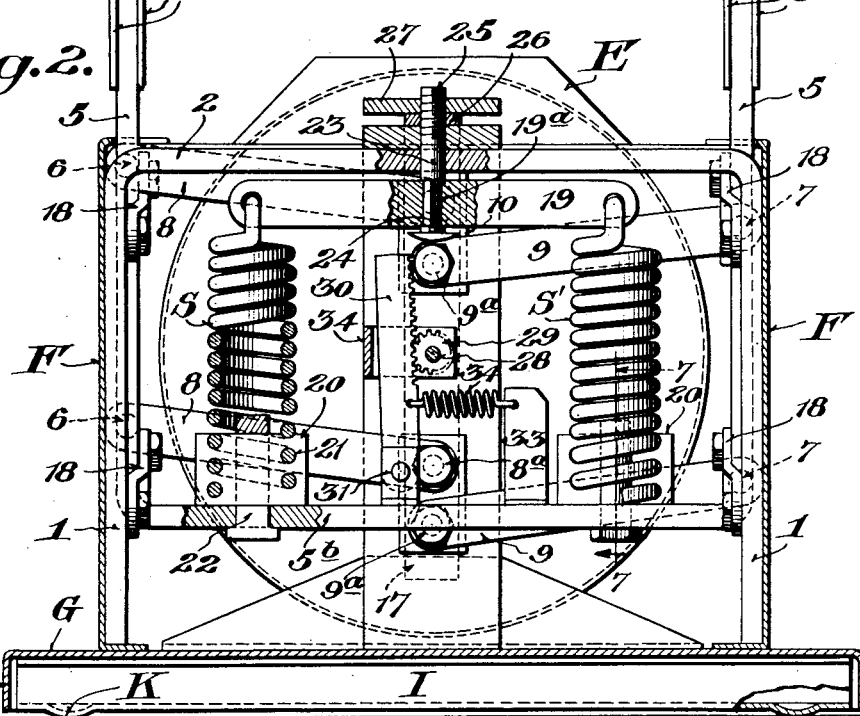
Inventor
Fred A. Schmitz, Oct. 9, 1928.  F. A. SCHMITZ  1,686,770
WEIGHING SCALE
Filed June 23, 1927  3 Sheets-Sheet 2
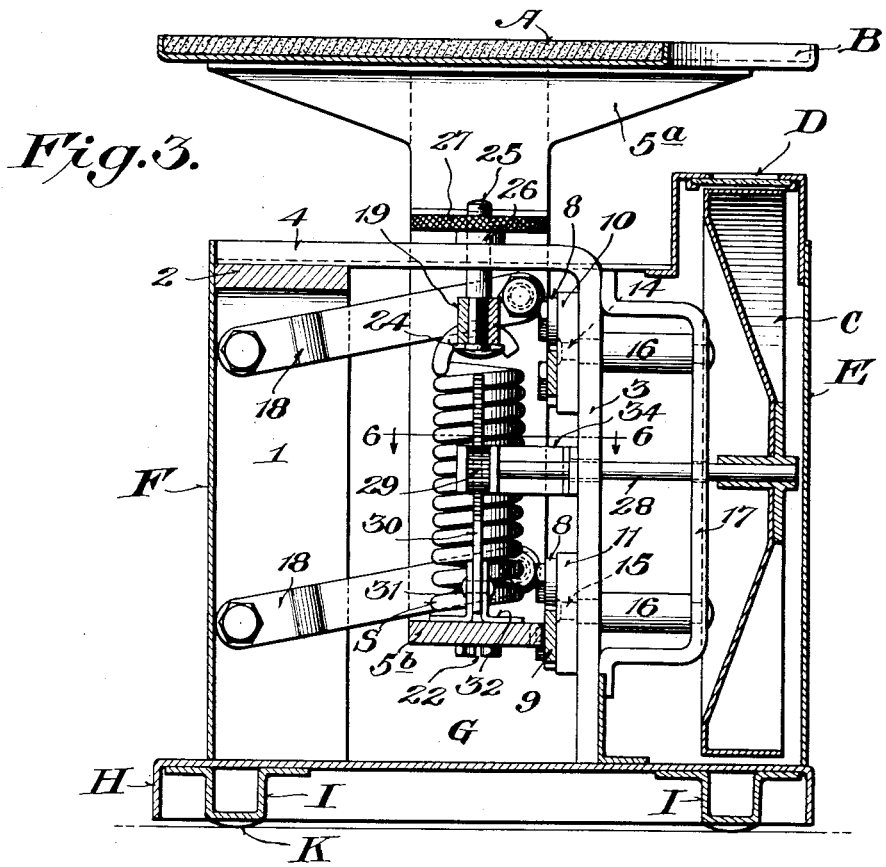
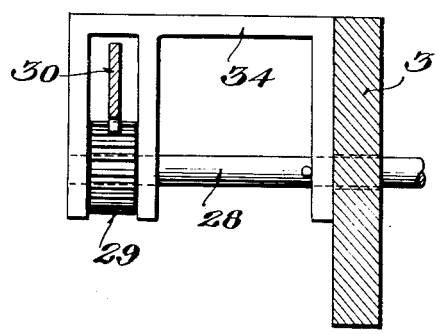
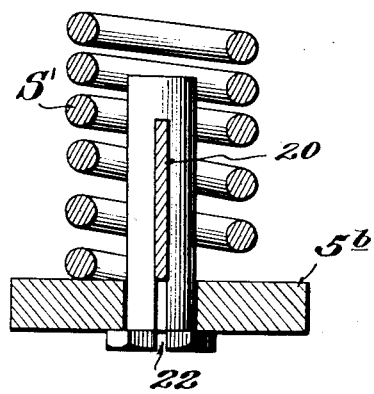
Witnesses:—
Chas. L. Griesbauer
Inventor
Fred A. Schmitz,
Attorney Oct. 9, 1928.
F. A. SCHMITZ
1,686,770
WEIGHING SCALE
Filed June 23, 1927    3 Sheets-Sheet 3
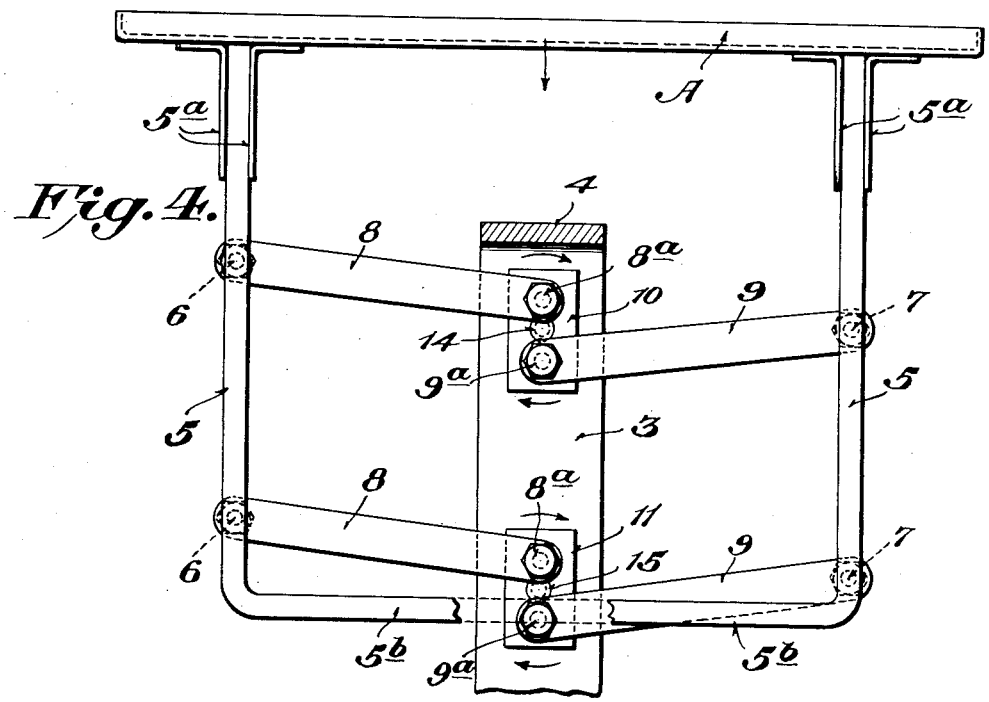
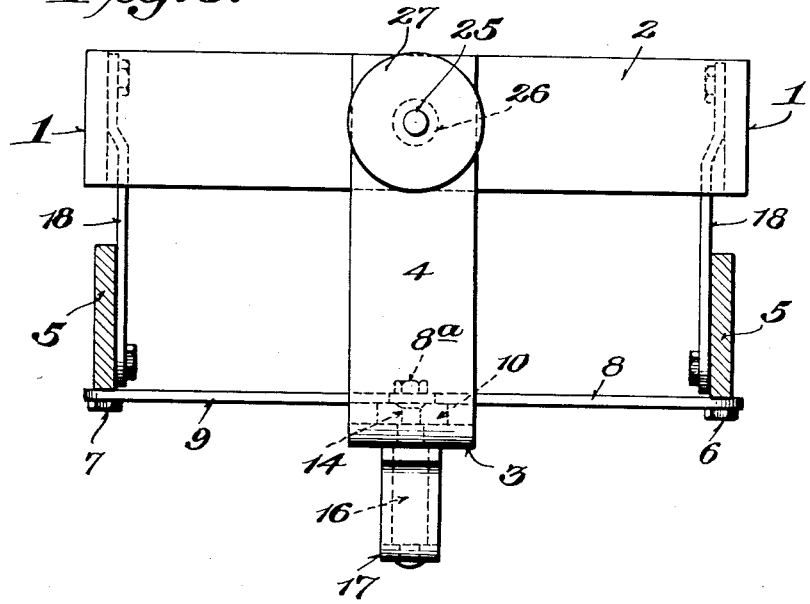
Inventor
Fred A. Schmitz,
WITNESSES:-
By
Attorney Patented Oct. 9, 1928.

1,686,770

UNITED STATES PATENT OFFICE.

FRED A. SCHMITZ, OF CLEVELAND, OHIO.

WEIGHING SCALE.

Application filed June 23, 1927. Serial No. 200,971.

This invention relates to scales, and more particularly to a so-called personal weight scale.

A primary object of the invention is to provide a novel construction that may be made from stamped metal parts, thereby not only simplifying manufacture and avoiding the use of castings, but also facilitating assembly. One of the essential requisites of a scale of the type set forth is steadiness and stability, and by making the various parts of substantial pressed or stamped metal, failures due to faulty castings are entirely eliminated, while at the same time the parts may be arranged and distributed in such a manner that the steadiness of the platform is preserved in balancing and sustaining the superposed weight of an individual.

Another object of the invention is to provide a novel arrangement of parts for causing the platform supports to move vertically without undue side motion or unequal distortion of the springs, thereby avoiding unnecessary friction or dragging of parts frequently occurring in similar devices.

A further object of the invention is to provide a novel spring suspension and means for adjusting the springs by a single, easily accessible and manually operated adjustable device.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Fig. 1 is a top plan view of the scale.

Fig. 2 is a vertical horizontal sectional view thereof.

Fig. 3 is a vertical cross-sectional view taken at right angles to Fig. 2.

Fig. 4 is a detail view illustrating the arrangement of compensating links for causing the platform to move down evenly if the weight or load is placed initially at one side of the platform.

Fig. 5 is a detail plan view of the main frame showing the guiding links for preventing sidewise rocking of the platform.

Figure 6 is an enlarged detail horizontal sectional view taken on the line 6—6 of Fig. 3.

Figure 7 is an enlarged detail vertical sectional view taken on the line 7—7 of Fig. 2.

Similar reference characters designate corresponding parts throughout the several figures of the drawings.

According to the embodiment of the invention shown in the drawings the present device includes in its organization a platform designated generally as A having one edge thereof notched or cut away as indicated at B to permit a person standing on the platform to view the readings on the dial C which are exposed through a suitable window D in the dial casing E, the said platform being carried and supported by scale mechanism arranged within the main housing F.

Referring more particularly to the scale mechanism it will be observed that the same includes a main frame consisting of a substantially inverted U-shape member having the vertical legs 1 and the horizontal top or web portion 2, together with the angular frame member including the vertical wall 3 and the horizontally disposed wall 4 which is welded or otherwise rigidly connected to the top web 2. For the purpose of increasing the stability of the device the side walls of the casing F may be welded to the outside faces of the legs 1, and the said main frame and casing are supported on a stamped-metal base G, which may be provided with the down-turned flanges H and also fitted with the channel members I, which materially reinforce the base and may also be provided with the extruded nibs K, which act as feet.

The platform A is mounted on and carried by the substantially U-shaped pedestal member which includes the upright arms 5 and the connecting web or bridge 5$^b$, the upper ends of the arms 5 being fitted with the head pieces 5$^a$ which provide an extended support for the platform. The arms 5—5 of the platform supporting pedestal each have secured thereto, as indicated at 6 and 7 respectively, the pairs of compensating links 8—8 and 9—9 whose inner ends connect as indicated at 8$^a$ and 9$^a$ respectively with the upper and lower ends of the intermediate links 10 and 11 which are mounted to turn on the rigid upper and lower pivot shafts 14 and 15. These shafts are mounted in the vertical wall 3 of the angular frame member, and are preferably formed by the reduced ends of the studs 16 and 17 arranged between the wall 3 and the bracket 17. This arrangement provides a strong and substantial axis or pivot for the compensating links 10 and 11 so that in event the weight or load is first placed on one edge of the platform A, that edge will not descend without pulling the other side of the platform with it, thereby avoiding the canting of the pedestal and preventing binding or jamming against the inside of the casing F.

Also, for preventing the sidewise rocking of the pedestal, both of the arms 5 thereof are pivotally connected to the legs 1—1 of the main frame through the medium of the paired guiding links 18—18 arranged at opposite ends of the main frame and clearly shown in Figs. 3 and 5. It will therefore be apparent that the pedestal for supporting or carrying the platform does not depend upon the casing for its vertical guiding movement, but is positively directed in its travel by the opposite pairs of links 8—8 and 9—9, which compensate for unequal distribution of load, while the guiding links 18—18 prevent lateral rocking of the platform. In other words, the bridge which carries the platform is guided in its movement by a system of right angularly disposed links or levers which equalize and offset uneven or unequal loading stresses in such a manner that the platform is maintained horizontal under all conditions of use, thereby providing an exceedingly stable construction and not depending upon the relatively light metal of the casing for any of its guiding movement.

The pedestal which carries the platform is suspended from a plurality of springs designated generally as S and S′, the said springs having their lower ends anchored in clamp blocks carried by the web 5ᵇ of the pedestal and the upper ends being suspended from the yoke 19 of a novel adjusting device.

Referring first to the means for clamping the lower ends of the spring to the web 5ᵇ of the pedestal it will be observed that the so-called clamp blocks include a plate 20 provided with openings 21 for receiving the lower convolutions of the spring. That is to say, the lower end of each spring is threaded into the openings 21 in the plate 20, and then the plate in turn is held to the bridge by means of a shackle bolt 22, the said bolt being slotted to receive the plate and having its head portion engaging the underside of the bridge 5ᵇ. With this arrangement it will be apparent that the lower ends of the springs S and S′ may be firmly anchored or connected to the web or bridge 5ᵇ, and as previously indicated, the upper ends of said springs are connected or hooked into the ends of the yoke 19. This yoke 19 is provided with a square central opening 19ᵃ for receiving the square shank portion of an adjusting screw 23 whose lower end is provided with a transverse opening between the head of the screw and the squared portion to receive a rocker pin 24 on which the yoke 19 rests. The upper end of the screw 23 is threaded as indicated at 25 and passes through the horizontal portion 4 of the angular frame member thereby to receive a nut 26 and an adjusting screw 27 which is accessible beneath the platform for the purpose of adjusting the spring yoke thereby to bring the dial at the proper setting.

For the purpose of transmitting the movement of the platform supporting pedestal to the dial C the said dial is supported on a shaft 28 which is journalled in the bracket 17 and also in the vertical wall 3 of the angular frame member. The end of the shaft 28 opposite the dial carries a pinion 29 adapted to be engaged by a rack 30 which is pivotally connected as at 31 with the lugs or ears 32 secured to the horizontal web 5ᵇ of the bridge. Also, for the purpose of causing the rack 30 to engage with the pinion 29 the said web 5ᵇ carries a lug 33 which forms a post for anchoring one end of a spring 34 which connects the post and the rack thereby to always draw or tension the rack against the pinion. As will be observed from Figs. 2 and 3, the vertical wall 3 of the angular frame member may also carry a pinion thrust bearing 34ᵃ which prevents bending of the dial shaft and consequent distortion of the pinion under the persisting tension of the spring 34 pulling the rack 30 thereagainst.

From the foregoing it will be apparent that the present construction provides an arrangement which will fulfill the objects set forth herein and provides a simple, practical and reliable device.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A weighing scale including a platform, a pedestal member for supporting the platform including spaced arms and a transverse connecting portion, springs connected to the transverse portion of said pedestal, a spring suspension member, means for adjusting the same, a frame, pivot shafts carried by said frame, compensating links connected at one end to said arms of the pedestal member, links mounted on said pivot shafts and connected to said compensating links, and a dial operatively connected with said pedestal member.

2. A weighing scale including a platform, means for supporting the platform comprising a pedestal including upright arms and a transverse connecting web, a frame, pivot shafts mounted in said frame, compensating means including links pivotally connected with said arms and with intermediate links pivotally supported on said shafts, guiding links arranged at right angles to the compensating means and pivotally connected at one end to the vertical arms of the pedestal and connected at their other ends to said frame, springs suspended from an adjustable supporting device and connected to the horizontal web portion of the platform supporting member, and a dial operatively connected with the said pedestal.

3. A weighing scale including a platform, a pedestal including upright arms and a transverse connecting web, a frame including frame members arranged respectively parallel to and at one side of the transverse web portion of the pedestal and at right angles to said web, compensating means for the pedestal including links pivotally connected to the arms of said member and pivotally connected at their inner ends to an intermediate link, shafts carried by the frame member arranged at right angles to the web of the pedestal and pivotally supporting said intermediate links, guiding links pivotally connected to said vertical arms of the pedestal and to the frame member which is arranged parallel to and at one side of the transverse web of the pedestal, springs connected at their lower ends to the transverse web of the pedestal, a yoke for supporting the upper ends of the springs, an adjustable screw for supporting the yoke, and a dial operatively connected with said transverse web of the pedestal.

4. A weighing scale including a platform, means for supporting the platform comprising a frame consisting of an inverted U-shaped frame member and an angular frame member mounted on a base and a substantially U-shaped pedestal member arranged parallel with said inverted U-shaped member supporting and carrying the platform at the upper ends of its arms, springs connected to the web of the pedestal member, and an adjusting device carried by the horizontal arm of the angular member of the frame and supporting the upper ends of said springs, means for guiding the pedestal relative to the members constituting the frame, and a dial operatively connected with the pedestal member.

5. A weighing scale including a platform supporting member, a frame part, springs engaging said platform supporting member, and means for suspending and supporting said springs comprising a yoke having the springs engaging opposite ends thereof, an adjusting screw passing through said frame part, a rocker pin carried by said screw whereby the yoke rests thereon, and an adjusting member engaging said adjusting screw and working against said frame part to control the position of said screw.

6. A weighing scale including a platform spring-suspension comprising in combination with a platform supporting member, a pair of springs, members having openings therein, shackle bolts for securing said members to said platform supporting member, and said members receiving the lower convolutions of the springs through the openings therein, a yoke having the upper ends of both springs connected therewith, and means for adjusting said yoke.

7. A weighing scale including a platform spring-suspension comprising in combination with a platform supporting member, springs connected at their lower ends with said member, a rigid frame part, a yoke having said springs secured to opposite ends thereof and provided with a central opening, an adjusting screw keyed in said opening, a rocker pin passing transversely through the screw and forming a rockable support for the yoke, and the shank of said screw extending through said frame part, and an adjusting nut engaging said screw and working against said frame part.

8. A weighing scale including a platform having a notch in one edge thereof, a platform supporting member, springs for suspending said platform supporting member, a dial visible through the notch in the edge of the platform, a dial carrying shaft, a pinion on said shaft, a rack pivotally carried by the platform supporting member, a spring for tensioning the rack against the pinion, and a thrust member for supporting the dial shaft in the zone of the pinion.

9. A weighing scale made of stamped metal parts including a base, channel members secured at the underside of the base for reinforcing the same, stamped metal frame members, a casing for housing the same, a platform, a stamped metal substantially U-shaped platform supporting member, compensating links and guiding links engaging said platform supporting member for causing the same to move in a vertical path, springs for suspending said platform supporting member, a rockable yoke connecting the upper ends of the springs, adjustable means for supporting the yoke, a dial, and rack and pinion means operated by the platform supporting member for operating the dial.

In testimony whereof I hereunto affix my signature.

FRED A. SCHMITZ.